Jan. 13, 1931. T. HALL 1,788,793
REMOTE CONTROL AND ANSWER-BACK SYSTEM
Original Filed Dec. 12, 1918 2 Sheets-Sheet 1
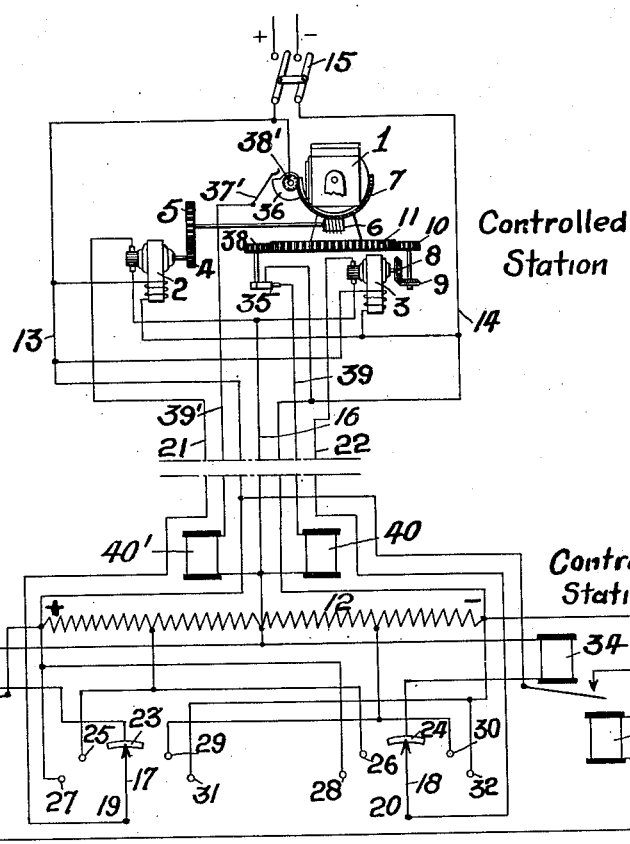
Fig. 1.
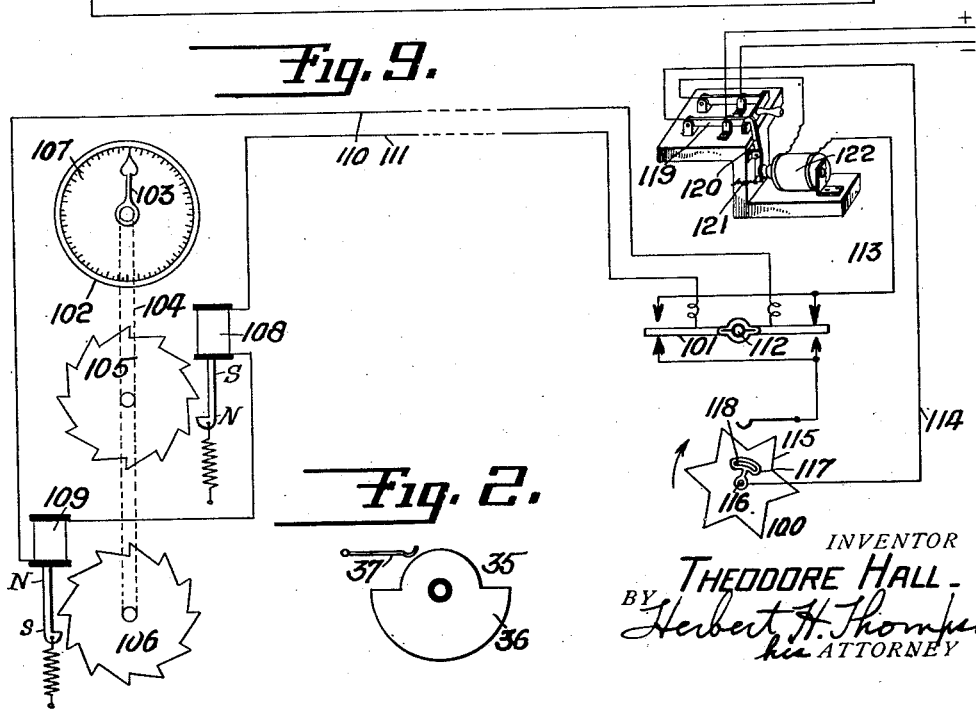
Fig. 9.
Fig. 2.
INVENTOR
THEODORE HALL
BY Herbert H. Thompson
his ATTORNEY Jan. 13, 1931. T. HALL 1,788,793
REMOTE CONTROL AND ANSWER-BACK SYSTEM
Original Filed Dec. 12, 1918 2 Sheets-Sheet 2
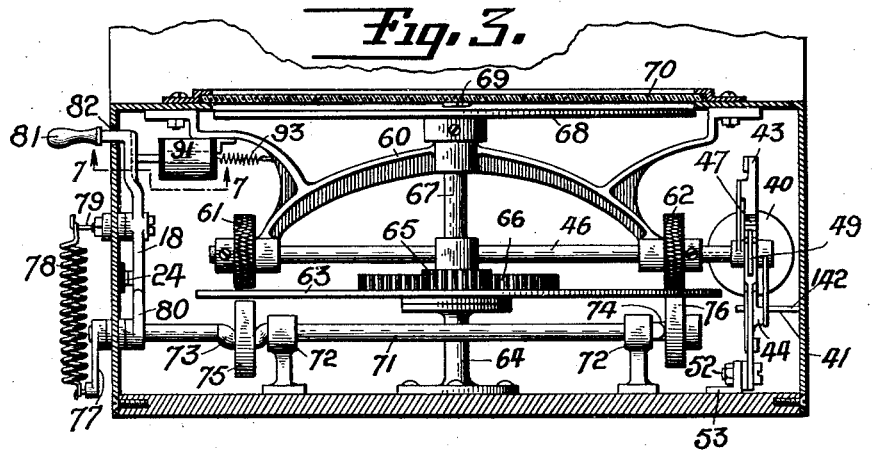
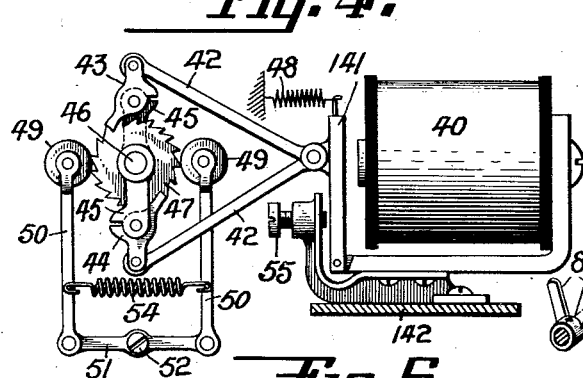
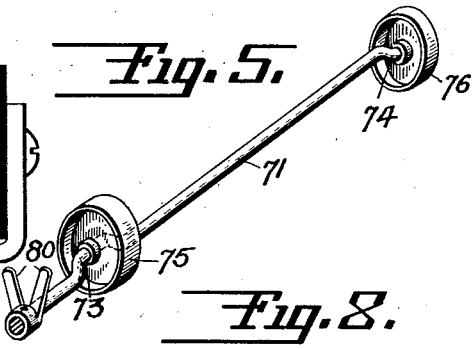
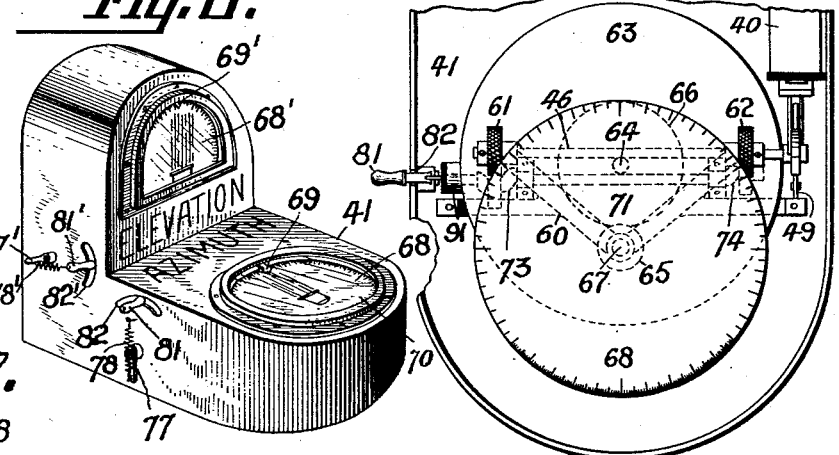
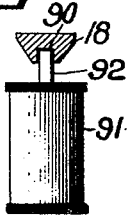
INVENTOR
THEODORE HALL
BY Herbert H. Thompson
his ATTORNEY Patented Jan. 13, 1931

1,788,793

UNITED STATES PATENT OFFICE

THEODORE HALL, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

REMOTE CONTROL AND ANSWER-BACK SYSTEM

Application filed December 12, 1918, Serial No. 266,420. Renewed May 29, 1930.

This invention relates to systems in which the position of an object is controlled at a distant station and which preferably comprise an indicator or indicators at the last mentioned station for informing the operator of the position of the object.

The importance and advantages of my invention may best be emphasized by considering its application to a military searchlight, bearing in mind, however, that it is capable of other uses, such as the control of a gun or any other object. Military searchlights are commonly placed at a position exposed to enemy gun fire and when in operation are apt to draw such fire. It is, therefore, desirable to control the movement of the searchlight from a distance so as to minimize the danger to the operator. It is also desirable to project the beam only when necessary and no longer than is necessary. Thus it is common practice for an operator to receive orders to direct his light in a certain direction in azimuth and a certain direction in elevaton. Preferably while the lamp is being swung to the desired position it should be dead, i. e. either deenergized or having a shutter across its front, so that the chances of being hit by gunfire are minimized.

If it is desired to direct a searchlight from a distance in accordance with the above practice it is clear that some means to apprise the operator at the control station of the position of the light at all times is practically indispensable.

One of the principal objects of the present invention is to provide a simple, reliable system embracing the above described desirable features and employing a minimum number of line wires between the searchlight and control station therefor. Other objects and advantages will appear as the description is hereinafter developed.

Referring to the drawings which illustrate what I now consider the preferred forms of my invention:

Fig. 1 is a diagrammatic view illustrating one form of my invention.

Fig. 2 is a detail of one of the transmitters employed in the system shown in Fig. 1.

Fig. 3 is a sectional elevation of one form of indicator.

Fig. 4 is a detail side elevation of the actuating mechanism of the indicator shown in Fig. 3.

Fig. 5 is a detail perspective of a portion of the clutch mechanism shown in Fig. 3.

Fig. 6 is a perspective of a complete indicator.

Fig. 7 is a detail section taken on the line 7—7 of Fig. 3.

Fig. 8 is a fragmentary plan view of a portion of the indicator illustrated in Fig. 6, a part of the casing being removed.

Fig. 9 is a diagrammatic view of a modified form of indicating system.

Referring to Fig. 1 it will be seen that I have shown a searchlight 1 rotatable 360° in azimuth and 180° in elevation so that the beam may be directed at any point on or above the horizontal plane of the light. Power means or translating devices, shown in the form of electric motors 2 and 3, are provided for actuating the light about both the vertical and horizontal axes. The elevation motor 2 is operatively connected with the light by means of gearing 4 to 7 and the azimuth motor 3 by means of gearing 8 to 11. As these motors, as disclosed, are of the ordinary D. C. type it will be obvious to those skilled in the art that the speed thereof may be controlled by varying the E. M. F. impressed across the fields or armatures thereof or both. I prefer to control the speed and direction of rotation of said motors by controlling the voltage across the armatures alone. Various expedients may be adopted to accomplish this function but in order that a great variety of speeds may be obtained with a minimum number of inter-station line wires I prefer to utilize the potentiometer system shown which may be constructed substantially as follows.

A resistance 12, located at the control station, is connected across the line wires 13, 14 which extend between the stations and are connected to any suitable source of E. M. F. through the switch 15 at the controlled station. One terminal of each of the armatures of the motors 2 and 3 is connected to a common wire 16 which in turn is connected to the mid or other intermediate point of the resistance 12. The other terminals of the motor armatures are each connected to the arm 17 or 18 of a corresponding one of the multi-point switches or controllers 19 and 20 located at the control station, by means of conductors 21, 22. Each of the controllers 19, 20 is provided with a purality of points one of which 23 or 24 is what may be termed a neutral point. Each of these neutral points is shown connected through a corresponding one of relays 34', 34 to the same point of resistance 12 to which common wire 16 is connected. If it is desired to dispense with the functions hereinafter described in connection with said relays 34', 34 the last mentioned connections may be made direct. The controller points 27, 28 are shown connected to one terminal of resistance 12 and the points 31, 32 to the opposite terminal thereof. The points 25, 26 are shown connected to a point of resistance 12 midway between the points of said resistance to which the wire 16 and controller points 23, 24 are connected. Similarly the controller points 29, 30 are connected to resistance 12 midway between the opposite terminal and middle thereof. Bearing in mind that the fields of motors 2 and 3 are connected in parallel across line 13, 14 and assuming that the switch 15 is closed the operation of my system as thus far described may be explained as follows.

The arms 17, 18 are shown in normal or neutral position in Fig. 1. While the fields of motors 2, 3 are energized at this time the armatures thereof are dead as the terminals thereof are connected to the same point on resistance 12, i. e. the mid point. If it is desired to cause the searchlight 1 to move in elevation the arm 17 is moved to the right or left onto contact 25 or 29 depending on the direction of movement of the searchlight desired. If the arm 17 is moved into contact with controller point 25 the armature of elevation motor 2 is connected across one-fourth of resistance 12 on the positive side thereof. The elevation motor 2 will, therefore, have an E. M. F. impressed on its armature substantially equal to one-fourth of full line voltage and will drive the searchlight at a corresponding speed. If it is desired to increase this speed the arm 17 may be moved into contact with controller point 27 in which event the armature of elevation motor 2 is connected across one-half of the resistance 12 at the positive end thereof. The motor 2 will, therefore, run in the same direction but at substantially double the speed corresponding to controller point 25.

If it is desired to cause the searchlight 1 to move in the opposite direction in elevation the arm 17 may be placed on controller point 29 in which event the armature of motor 2 will be connected across one-fourth of resistance 12 at the negative end thereof. The corresponding speed of the motor 2 will be the same as that corresponding to controller point 25 but the motor will run in the opposite direction as the polarity of its armature is reversed with respect to the field. If it is desired to speed the movement up in the last mentioned direction the arm 17 should be placed on point 31. In view of the above explanation it will be obvious to those skilled in the art that the searchlight 1 may be moved in azimuth in either direction by operating controller 20. Furthermore the elevation and azimuth controls may be effected either singly or simultaneously.

It should be noted that when either of the controller arms 17 or 18 is returned to neutral position, into contact with points 23 or 24, the corresponding one of the armatures of motors 2, 3 will be practically short-circuited as the resistance of relays 34', 34 is comparatively low. As the motor fields remain excited the motors 2, 3 will operate as generators when arms 17, 18 engage points 23, 24 respectively. A strong braking torque will, therefore, be exerted on the searchlight by each motor and quickly bring it to rest when the controller handles 17, 18 are brought to neutral position.

I wish to call attention to the fact that the system as thus far described employs only five inter-station conductors 13, 14, 16, 21, 22 and one of these may be dispensed with if it is desired to employ a ground path. It should also be noted that by increasing the number of points of controllers 19, 20 and by providing suitable resistance taps therefor the number of different speeds may be increased to any desired value without increasing the number of inter-station conductors. By providing a large number of available speeds the searchlight may be readily kept on any target no matter with what speed the latter is moving.

Various forms of indicating systems may be employed to inform the operator at the control station of the position of the searchlight at all times. I prefer, however, to employ the system illustrated in Figs. 1 to 8 which may be constructed substantially as follows. I will first describe that portion of the indicating system which may be termed the azimuth indicating system.

A transmitter 35 comprising a rotatable conducting cam 36 and a stationary brush 37 (see Figs. 1 and 2) is actuated by the gear 11 through a gear 38 secured to the same shaft to which the cam 36 is secured. The movable contact 36 of the azimuth transmitter 35 is shown connected to the conductor 14 at the controlled station end while the stationary contact or brush 37 is connected to the conductor 16 through a line conductor 39 and electromagnet 40 at the control station. This electromagnet 40 forms an element of the azimuth indicator actuating mechanism of which one form is illustrated in Figs. 3 and 4.

A casing 41 is provided with a bracket 142 on which the electromagnet 40 is mounted. The pivoted armature 141 of the latter has pivotally connected thereto a pair of links 42 each in turn pivotally connected to a corresponding one of alternately acting pawls 43 and 44. The latter are shown pivotally mounted on arms 45 loosely mounted on a shaft 46. A ratchet wheel 47 is secured to said shaft 46 in a position to be actuated in one direction on movement of the armature 141 in either direction. Movement of said armature in one direction is effected by energization of the electromagnet 40 and in the opposite direction by a spring 48 on de-energization of said electromagnet. A pair of rollers 49, rotatably mounted on links 50 and biased to ratchet-engaging position by means of a spring 54, may be provided for preventing displacement of said ratchet except when the latter is actuated by its pawls. The links 50 are shown pivotally mounted on an arm 51 secured at 52 to a bracket 53 in turn secured to the casing 41. The extent of movement of the shaft 46 on movement of the armature 141, either by solenoid 40 or spring 48, may be controlled by means of an adjustable back stop 55. If the searchlight 1 were moved only in one direction in azimuth the shaft 46 could be geared directly to the azimuth indicator. It is preferable, however, that the light be movable in both directions. While this problem might be met by employing a system comprising two electromagnets such as the electromagnet 40 I prefer to employ a single one and to provide a reversing mechanism between the shaft 46 and the azimuth indicator. One form of such mechanism is illustrated in Figs. 3 to 6 and 8 and may be constructed substantially as follows.

The shaft 46, which is rotatably mounted in a yoke 60 secured to casing 41, has secured thereon a pair of clutch wheels 61, 62. A flexible disc 63 is rotatably mounted, below said wheels, on a pedestal 64 secured to casing 41. The disc 63 has secured thereto a gear 66 which meshes with a gear 65 secured to a shaft 67 journalled in the yoke 60. Secured to the upper end of said shaft 67 is an indicating element 68 shown in the form of a dial calibrated in degrees or fractions thereof and cooperating with a reference pointer 69 secured to the casing 41. The dial is adapted to be read through a window 70 provided in said casing. Means are provided for moving one side or the other of the disc 63 into engagement with one or the other of the wheels 61, 62. This means is preferably controlled either directly or indirectly by the azimuth controller 20 so that when the azimuth motor 3 drives the searchlight 1 in one direction or the other the azimuth indicator will be actuated in a corresponding direction. One form of such means is illustrated in Figs. 3 to 6 and 8 and may be constructed substantially as follows.

A shaft 71, journalled at 72 on the base of the casing 41 is provided with oppositely offset portions 73, 74 on which rollers 75, 76 are mounted in a position substantially under wheels 61, 62. One end of the shaft 71 is provided with an arm 77 secured thereto in such position that when the arm is extending vertically downward neither of the rollers 75, 76 is in engagement with the disc 63 and the latter does not engage either of the wheels 61, 62. A spring 78, connected at one end to the arm 77 and at the other to a pin 79 vertically above the shaft 71, is provided to snap and hold one or the other of the rollers 75, 76 into engagement with the disc 63 to force the latter upwardly into contact with one or the other of the wheels 61, 62. The shaft 71 has also secured thereto a pair of arms 80 between which the end of the azimuth controller arm 18 is adapted to extend. The latter is shown pivoted on casing 41 and provided with an operating handle 81 which projects through a slot 82 in the side of the casing. The design of the last described parts is preferably such that when the arm 18 is in neutral position it does not engage either of the arms 80 but before it engages either of studs or controller points 26, 30, when moved to reverse the azimuth motor, it will engage one of said arms 80 to throw the shaft 71 over central position. The spring 78 will then complete the throw of the shaft and hold the latter in the new position until the arm 18 is thrown to the other side of neutral position. The azimuth indicating system is designed and intended to operate substantially as follows.

Assume that the controller arm 18 is on one or the other of contact points 30, 32, that the searchlight is moving clockwise in azimuth and that before such motion commenced the dial 68 was synchronized with the searchlight in azimuth. The azimuth transmitter 35 will be actuated to make and break the circuit of the electromagnet 40 and the shaft 46 will be actuated in a counterclockwise direction as viewed in Fig. 4. The roller 76 is at this time in the operative position and urges the disc 63 into engagement with roller 62 so that the dial 68 will be actuated in clockwise direction to indicate the position of the searchlight in azimuth. If the controller arm is returned to neutral position the azimuth transmitter and indicator come to rest as soon as the searchlight does. If the arm 18 is moved toward the controller point 26 to reverse the direction of movement of the searchlight the lower end of said arm engages one of the arms 80 to cause the following action to take place before contact is established with said last named controller point. The shaft 71 is moved by the arm 18 so as to pass through the position in which the arm 77 is vertical thus moving roller 76 away from disc 63 and permitting the spring 78 to snap the roller 75 into engagement with said disc. When the arm 18 engages stud 26 the searchlight will move in a counter-clockwise direction as will also the dial 68 as the disc 63 and wheel 61 are now in engagement.

It is clear that with proper design and operation of the above described indicating system the position of the searchlight 1 in azimuth will at all times be indicated at the control station. It is possible, however, that the system may be so designed that the handle 18 could be thrown from the first contact point on one side of the neutral point 24 to the first contact point on the other side before actual reversal of the azimuth motor and searchlight took place. This would lead to loss of synchronism between the light and azimuth indicator as will be understood in view of the following explanation.

Assume again that the controller arm 18 is on controller point 30. The searchlight 1 and azimuth dial 68 are then rotating in a clockwise direction. If the arm 18 is now thrown so rapidly into contact with stud 26 that the azimuth motor and searchlight do not have time to reverse the light will be running in a clockwise direction in azimuth while the rollers 76, 75 will have been shifted to cause the azimuth dial to move counter-clockwise. Loss of synchronism will clearly result.

In order to prevent the possibility of the above mentioned loss of synchronism, means may be provided for preventing passage of the controller arm 18 through neutral position unless the searchlight is at rest. One form of such means is illustrated in Figs. 1, 2, and 7 and may be constructed as follows.

The controller arm 18 is provided on its inner face with a double bevel and slot 90. A solenoid 91 is mounted on the frame 60 and provided with a core extension or rod 92 adapted to seat in said slot 90 when the arm 18 is in neutral position and said solenoid is energized. A spring 93 may be provided for withdrawing the rod 92 from the slot 90 when the solenoid is deenergized. The solenoid 91 is connected across the line 13, 14 at the control station end in series with the front contacts of the relay 34. As previously explained when the searchlight 1 is moving in either direction and the arm 8 is moved into engagement with the neutral contact 24 the motor 3 will act as a generator with the low resistance relay 34 as a load and will quickly bring the searchlight to rest. If the latter comes to rest before the arm 18 reaches exact neutral position the said arm may be moved through the last mentioned position without hindrance. If, however, the searchlight continues to run on its momentum the relay 34 will continue to be energized to cause energization of solenoid 91. The latter throws the rod 92 into slot-engaging position so that when the arm 18 reaches neutral position said rod will enter the slot 90 and prevent movement of said arm until the solenoid 91 is deenergized, i. e. until the searchlight 1 and machine 3 come to rest.

The elevation indicating system is so similar to the azimuth indicating system that no detailed description thereof need be given. Corresponding elements in the two systems are designated by the same reference characters, one set of which are primed. The following differences should be noted however. The elevation indicator is preferably mounted in a position at right angles to the azimuth indicator as shown in Fig. 6 and for this reason the casing 41 is made L shaped. Furthermore, as the specific searchlight disclosed is movable only 180° in elevation the elevation dial 68' need only be calibrated to 180°. By virtue of my system it will be appreciated that the position of a searchlight or other object about either or both of two axes may be controlled from a distance; the speed may be any one of a large number of speeds; the position of the searchlight is indicated at all times to the distant operator, without employing more than seven inter-station wires and with comparatively simple mechanism. The system as above disclosed, especially the indicating portion thereof, is susceptible to wide modification. One such modification is illustrated in Fig. 9 in which I have omitted the motor control system, which may be the same as that illustrated in Fig. 1, and which view I have restricted to an azimuth indicating system to avoid surplusage.

The system disclosed in Fig. 9 comprises a transmitter 100, a pole changer 101, which are both located at the controlled station, and an indicator 102 located at the control station. The latter is shown comprising a pointer 103 secured to a shaft 104 to which are secured two ratchet wheels 105, 106 having oppositely directed teeth. The pointer 103 is movable over a stationary dial 107 calibrated in degrees or fractions thereof. Each of the ratchet wheels 105, 106 is provided with an actuating solenoid 108, 109 which are shown connected in series across the inter-station conductors 110, 111. The solenoids 108, 109 are polarized in such a manner that when current is flowing in one direction in the line 110, 111 one, and only one, of said solenoids will attract its core and when the current flows in the opposite direction the other solenoid alone will attract its core. The conductors 110, 111 are conected to the arms of the pole-changer 101 which is frictionally mounted on the shaft 112 of the azimuth motor. One set of the contacts of said pole changer 101 is connected to conductor 113 while the other set is connected to the conductor 114 through the transmitter 100. The movable contact 115 of the last mentioned member is loosely mounted on a shaft 116 corresponding to the shaft of the azimuth transmitter 35 shown in Fig. 1. Said contact 115 is operatively connected to said shaft 116 by means of a lost motion connection which performs a very important function, as will hereinafter appear, and which is shown as comprising a slotted arm 117 secured to said shaft and a pin 118 secured to said contact.

The operation of this modification may be explained as follows. Assume that the searchlight and indicator arm 103 are synchronized in azimuth, the line 113, 114 energized and the searchlight starting to move so as to cause the shaft 116 to turn in the direction of the arrow. The pole changer 101 will immediately be thrown to such a position that when the circuit is made through transmitter 100 that one of solenoids 108, 109 will be energized which causes the pointer 103 to move in the same direction as the searchlight. The design is such that the pointer 103 will be moved at the same angular velocity as the searchlight so that the position of the latter will be indicated at the control station at all times. When the searchlight and its azimuth motor come to rest the pointer 103 stops also, the pole changer remaining in its actuated position. If the searchlight is again rotated in the same direction the above operation is simply repeated. If, however, the searchlight is reversed the pole changer is thrown to its other position so that the other of solenoids 108, 109 will operate on closure of the circuit by transmitter 100 to cause the pointer 103 to move in a direction opposite to that above mentioned. The lost motion device 117, 118 is so designed that on reversal of shaft 116 the latter travels an angular distance, equal to the angular distance between adjacent raised portions of contact 115, before said shaft picks up said contact. This lost motion means prevents loss in synchronism between the indicator and searchlight on reversal of the latter. Thus, if the contact 115 were directly connected to the shaft 116, a loss of synchronism to the extent of one step would result on reversal of the searchlight.

As is usually the case the conductors 113, 114 are connected to the source of D. C. (not shown) through a switch 119. If the transmitter 100 stops in open position no loss of synchronism will result on opening and closure of said switch. Bearing in mind, however, that when the azimuth motor comes to rest the pole changer remains in the position it occupied immediately before said motor stopped it will be seen that when the transmitter stops in closed position the pointer may be stepped around by opening and closing the switch 119 although the searchlight is at rest. In order to prevent this I preferably provide means for preventing opening of the last mentioned switch when the transmitter is in closed position.

The last mentioned means may assume the form illustrated in Fig. 9 and comprising a pivoted locking latch 120 adapted to be thrown into a position in which it locks the switch closed on energization of the actuating solenoid 122. The latch 120 is biased to switch-releasing position by a spring 121. As the electromagnet 122 is in the line wire 113 it will be clear that the switch 119 cannot be opened unless the searchlight is stopped at a position where the transmitter 100 is open.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results outlined, and the invention extends to such use.

Having described my invention, what I claim and desire to secure by Letters Patent is:—

1. A remote control system comprising power means at the controlled station, means including a controller at the control station for governing said power means, a transmitter at the controlled station, an indicator at the control station, reversible connections between said indicator and said transmitter, and means for actuating said reversible connections by said controller.

2. A system for indicating and controlling the position of an object at a distance, said system comprising a plurality of electric motors for actuating said object about different axes, a plurality of inter-station conductors, one of said conductors being connected to one terminal of each armature of said motors and the other conductors being connected to the remaining terminals of said motors, a resistance at the control station, means for impressing a difference of potential on the terminals of said resistance, means at said control station for connecting the armature conductors to each other or to points of different potential on said resistance, and means including an element actuated by said object for indicating at the control station the position of said object about said axes.

3. In combination, a transmitter, a translating device controlled thereby, an indicator, reversible connections between said indicator and translating device, means comprising a control element for governing the direction of rotation of said transmitter and means for actuating said reversible connections by said control element.

4. A system for controlling the position of an object from a distance, said system comprising a plurality of electric motors connected to said object for actuating the same about different axes, a plurality of interstation armature conductors, one for each motor connected to one terminal of the armature thereof, a plurality of interrupters actuated by the object, an inter-station conductor for each interrupter and connected thereto, a plurality of indicators at the control station, one for each of said interrupters, a common inter-station conductor for said interrupters and armatures, means for impressing different voltages across said armature conductors and means for causing each indicator to follow movement of the object about a corresponding axis in either direction in response to impulses received over a corresponding one of the conductors connected to said interrupters.

5. A system for controlling the position of an object at a distance comprising an electric motor for actuating said object, means including a potentiometer at the control station for varying the speed of said motor, and means controlled by said motor and including an element in circuit with said potentiometer for indicating at the control station the position of said object.

6. A remote control system comprising power means at the controlled station, means including a controller for governing said power means, an indicator at the control station including a rotatable disc, a plurality of driving members for driving said disc in either of two directions, and means whereby operation of said controller renders one or the other of said driving members effective to determine the direction of operation of said disc.

7. A remote control system comprising power means at the controlled station, means including a controller at the control station for governing said power means, an indicator having a movable member controlled by said power means and operable in either of two directions, and means for preventing change of direction of the movable member of said indicator before said power means has changed its direction.

8. A remote control system comprising power means at the controlled station, means including a controller at the control station for governing said power means, a transmitter at the controlled station, an indicator at the control station, reversible connections between said indicator and said transmitter, means for actuating said reversible connections by said controller, and means for preventing actuation of said controller to reverse said connections before said power means has come to rest.

9. A remote control system comprising power means at the controlled station, an indicator at the control station, reversible connections between said power means and said indicator, and a single controller for governing said power means and actuating said reversible connections.

In testimony whereof I have affixed my signature.

THEODORE HALL.